Figure 1:
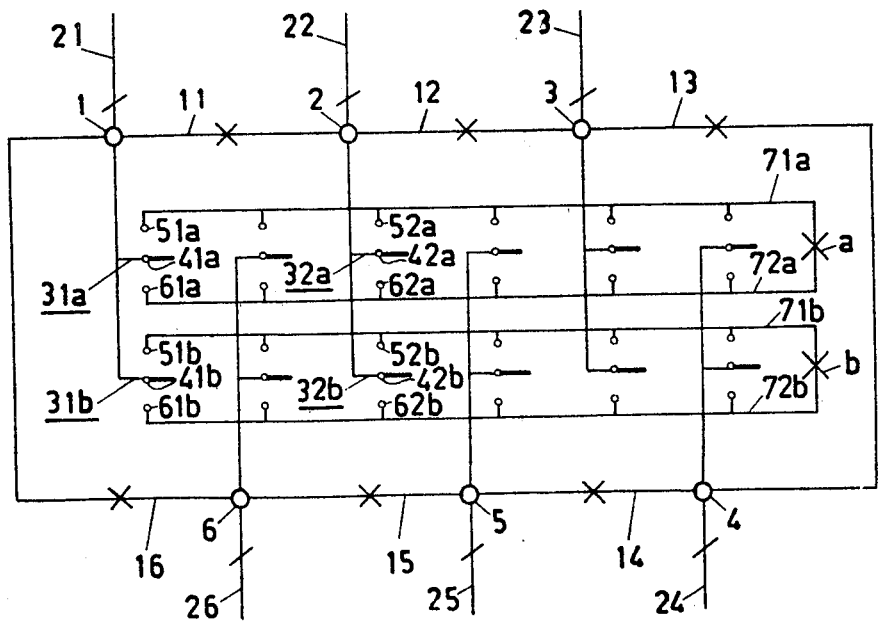

United States Patent [19]

Blahous et al.

[11] Patent Number: 4,480,193

[45] Date of Patent: Oct. 30, 1984

[54] SWITCHING SYSTEM

[75] Inventors: Leopold Blahous, Wettingen; Georg Köppl, Birr, both of Switzerland

[73] Assignee: BBC Brown Boveri & Company, Limited, Baden, Switzerland

[21] Appl. No.: 502,550

[22] Filed: Jun. 9, 1983

[30] Foreign Application Priority Data

Jun. 30, 1982 [CH] Switzerland .................. 3994/82

[51] Int. Cl.³ .................. H02B 01/24; H02H 3/26; H02J 4/00
[52] U.S. Cl. .................. 307/19; 307/29; 307/42; 307/85; 307/113; 361/62
[58] Field of Search .................. 307/11–13, 307/18, 19, 42, 85, 29, 112, 113, 132 R; 361/62

[56] References Cited

U.S. PATENT DOCUMENTS

| | | | |
|---|---|---|---|
| 1,955,311 | 4/1934 | Parsons | 307/112 X |
| 3,887,821 | 6/1975 | Stipceuich | 307/112 |
| 4,042,968 | 8/1977 | Kypreas et al. | 307/19 X |
| 4,247,787 | 1/1981 | Page | 307/112 |

FOREIGN PATENT DOCUMENTS 0079628  5/1983  European Pat. Off. ............ 307/113

Primary Examiner—Reinhard J. Eisenzopf
Assistant Examiner—Derek S. Jennings
Attorney, Agent, or Firm—Burnes, Doane, Swecker & Mathis

[57] ABSTRACT

In a switching system having n nodes (1,2 ... 6) which are connected via interruptible current branches (11,12 ... 16) in the form of a ring, in the case of non-availability of at least one of the nodes or at least one of the switching points provided in the interruptible current branches (for example 11) the nodes which are still available are to be connected in the form of a ring, the structure of which is nearly unaltered in the undisturbed areas of the switching system with respect to the corresponding structure of the ring provided in the undisturbed system. For this purpose, n dual isolating switches (31a, 32a, ... ) and a circuit breaker (a) are provided which are connected to the nodes (1,2 ... 6) in such a manner that each node (for example 1) can be connected to any one of the other nodes (for example 2) via one of the n dual isolating switches (for example 31a), the circuit breaker (a) and another one of the n dual isolating switches (for example 32a).

5 Claims, 3 Drawing Figures

SWITCHING SYSTEM

The invention relates to a switching system in which multiple nodes are connected in the form of a ring by interruptable current branches, and wherein each node can also be connected to two other nodes by at least two bridge branches each having two isolating switches and a circuit breaker connected in series.

Such a system has been proposed in Swiss patent application No. 7268/81-1 of Dec. 11, 1981. In this system, each of the n nodes, which are connected via interruptible current branches in the form of a ring, can be connected via bridge branches to at least two of the other nodes. Each of these bridge branches is provided with two isolating switches and one circuit breaker which is disposed between these isolating switches and is common to these bridge branches. Although this provides, with a low expenditure in equipment and simultaneous low space requirement, a high redundancy of the switching system in the case of a failure of one switching point in one of the switching branches which connect the nodes in the form of a ring or in the case of a failure of one of the nodes themselves, the nodes which are intact can generally be connected to each other only with considerable changes in the original ring structure.

For this reason, the invention has the objective of developing a switching system of the generic type in such a manner that, in the case of non-availability of at least one of the nodes or of at least one of the switching points which are provided in the current branches connecting the nodes, the nodes still available can be switched in the form of a ring, the structure of which is nearly unchanged in the available areas of the switching system with respect to the corresponding structure of the ring in the fully available system.

This objective is achieved by the fact that each bridge branch comprises two groups of isolating switches. Within each group of switches, one contact of each is connected in common to one side of a circuit breaker and the other contact is connected to one of the nodes. The switching system according to the invention is distinguished by the fact that any two nodes of the system can be connected to each other if necessary so that in the event of a failure of one of the switching points which are provided in the current branches connecting the nodes or in the event of a failure of a node, the ring provided in the undisturbed switching system remains intact, apart from the non-available parts switched out of circuit, by actuating only two or four isolating switches and one circuit breaker. Disregarding the switching out of circuit of the non-available system parts, for this reason no further switching actions need to be carried out in the ring.

It is recommended to develop the switching system with dual, i.e. double-throw, single-pole, isolating switches having their common contacts connected to the nodes and their non-common contacts respectively connected to opposite sides of the circuit breaker, since such a system is constructed in a particularly simple and clear manner.

If the switching system according to the invention is configured so that all of the switches in each group are dual isolating switches, such a system in addition is also distinguished by a particularly compact form of construction, which is of advantage especially when it is designed as a gas-insulated, encapsulated switching system.

If the switching system according to the invention is constructed with dual isolating switches that contain rotatable blades, it can be used with particular advantage as an open-air switching system.

The switching system according to the invention developed in which each node is connected to the isolating switches in each of two bridge branches is distinguished by dual redundancy. In this system, any two nodes or any two switching points, may be unavailable, while nevertheless a ring which is as large as possible can always be restored.

Figure 2:
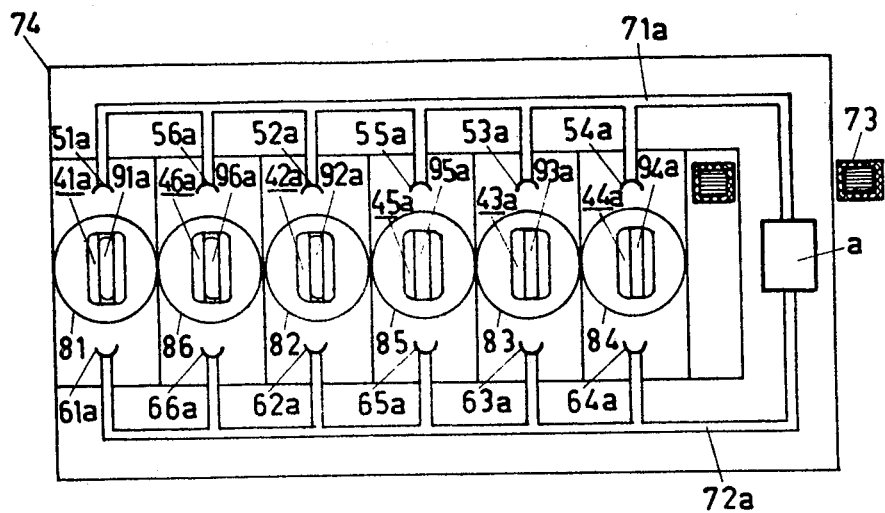
Figure 3:
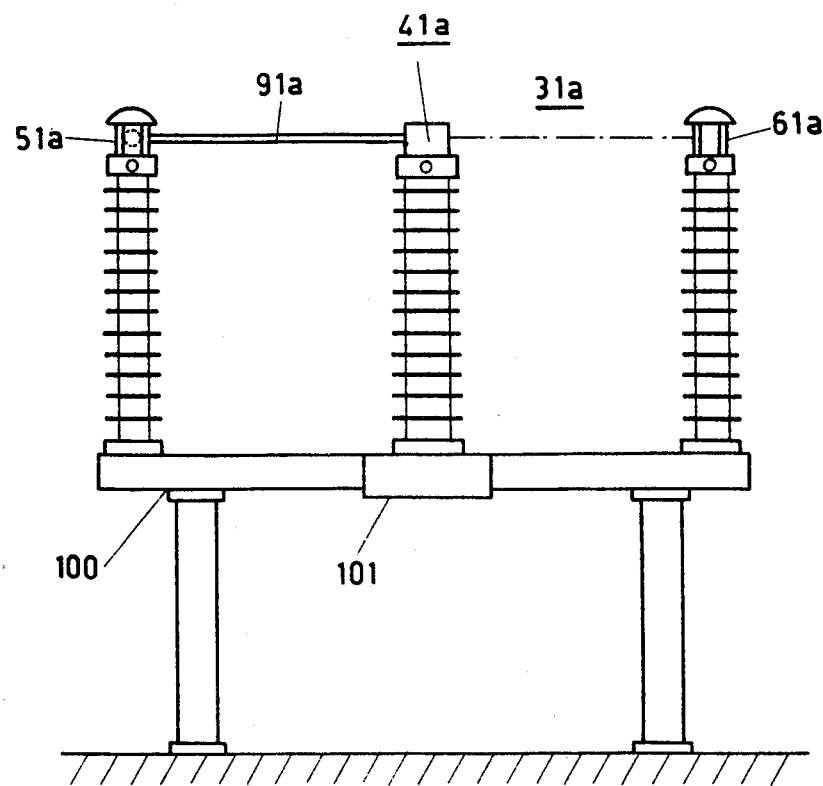

In the text which follows, illustrative embodiments of the invention are shown in a simplified form with the aid of the drawing, in which:

FIG. 1 shows a circuit diagram of a switching system according to the invention with a dual redundancy ring circuit containing six nodes which can be connected to each other via twelve dual isolating switches and two circuit breakers;

FIG. 2 shows a side view of a section of a part of the switching system according to FIG. 1, in which the dual isolating switches and circuit breakers are constructed as encapsulated gas-insulated components; and FIG. 3 shows a side view of one of the dual isolating switches of the switching system according to FIG. 1 in which the dual isolating switches are constructed to be suitable for outdoor use.

In all Figures identical parts carry identical reference designations. The circuit diagram shown in FIG. 1 of the switching system according to the invention has nodes 1,2,3,4,5 and 6. These nodes are connected in the form of a ring and numbered consecutively along the periphery of the ring.

Each of the nodes 1 to 6 adjoins two adjacent nodes to which they are connected by means of two of the current branches 11,12,13,14,15 and 16. In each of the current branches 11 to 16 a switching point marked by a cross is provided. Each switching point can consist of an isolating switch connected in series with a circuit breaker, a current transformer and another isolating switch. At nodes 1 to 6 current outputs and inputs 21,22,23,24,25 and 26 are located. In each current output and in each current input respectively an isolating switch merely symbolically marked by a diagonal line and, if necessary, an overvoltage arrester and a grounding switch are provided.

In addition, the nodes 1 to 6 can however also be connected via circuit breakers a and b respectively, and dual isolating switches 31a and 31b, 32a and 32b, 33a and 33b, 34a and 34b, 35a and 35b, 36a and 36b shown inside the ring. Of the dual isolating switches, only those connected to nodes 1 and 2 have been provided with reference designations for reasons of clarity. The nodes 1,2, . . . 6 are consecutively connected to moveable centre contacts 41a and 41b, 42a and 42b, 43a and 43b, 44a and 44b, 45a and 45b, 46a and 46b of the dual isolating switches. Only the centre contacts of the dual isolating switches 31a, 31b, 32a and 32b have been designated, also for reasons of clarity. Fixed outer contacts 51a,52a,53a,54a,55a,56a, of which only the contacts 51a and 52a have been provided with reference designations, of the dual isolating switches 31a,32a,33a,34a,35a and 36a are connected via a connecting line 71a and a current transformer, not shown in FIG. 1, to one of the contacts of the circuit breaker a, whereas fixed outer contacts 61a,62a,63a,64a,65a and 66a, of which also only the contacts 61a and 62a are provided with reference designations, are connected via a connecting line 72a to the other one of the two contacts of the circuit breaker a. Correspondingly, outer contacts 51b,52b, ... of the dual isolating switches 31b,32b, ... are connected via a connecting line 71b and a current transformer, not shown in FIG. 1, to one of the two contacts of the circuit breaker b and outer contacts 61b,62b, ... of the dual isolating switches 31b,32b, ... via a connecting line 72b to the other one of the two contacts of the circuit breaker b. The centre contacts 41a or 41b ... of all rotary isolating switches 31a or 31b, ... are constructed in such a manner that they can be made to engage with either the one or the other outer contact 51a or 61a or 51b or 61b ... or none of the two outer contacts.

Such a system operates as follows:

With the switching system in normal operating condition, the switching points disposed in the current branches 11 to 16 of the ring will be closed and the circuit breakers a and b and the dual isolating switches 31a and 31b, ... 36a and 36b, ... will be open. In the case of non-availability of one of the switching points provided in the current branches 11, ... 16, the non-available switching points can be bridged and the original ring can be restored by closing one of the circuit breakers a or b and two dual isolating switches 31a,32a, ... 36a or 31b,32b, ... 36b connected to this circuit breaker. If now another switching point in the ring fails, the original ring can be restored in corresponding manner via the other one of the two circuit breakers and two dual isolating switches connected to this circuit breaker. If, for example, the switching point provided in current branch 11 is not available, for instance because of maintenance work, the nodes 1 and 2 affected by this can be connected to each other by closing the contacts 41a and 61a of the dual isolating switch 31a and 42a and 52a of the dual isolating switch 32a and subsequently closing the circuit breaker a. If now another switching point provided in the ring, for example the one provided in current branch 13, is also not available, the original ring can be restored in corresponding manner by closing the dual isolating switch 33b and 34b, not designated in FIG. 1, and the circuit breaker b.

FIG. 2 shows a spatial arrangement of a part of the switching system according to FIG. 1. In this arrangement, the dual isolating switches 31a,32a, ... 36a and the circuit breaker a are constructed as encapsulated gas-insulated components, and the encapsulation of these components has been removed in the direction of the viewer. The connecting lines 71a and 72a are constructed as bus bars and are disposed in a metal housing 74 filled with insulating gas such as $SF_6$ in the same way as a current transformer 73. The nodes 1,2, ... 6 are connected to the centre contacts 41a,42a, ... 46a of each rotary isolating switch 31a,32a, ... 36a, for instance via pipe-type gas-filled cables 81,82, ... 86. The centre contacts have in each case a moveable contact part 91a,92a, ... 96a which can be made to engage with one of the fixed outer contacts 51a or 61a, 52a or 62a, ... 56a or 66a via a drive not shown.

The dual isolating switch 31a, shown in FIG. 3, has been constructed for outdoor use and is mounted on a frame 100 which also carries a drive 101 for the contact part 91a constructed as a rotatable isolating blade. The contacts 41a, 51a and 61a are mounted on porcelain insulators, not designated. The centre contact 41a is connected to the node 1 via a conductor cable, not shown.

Naturally, the switching system is not restricted to six nodes but can have only three, four or five but also more than six nodes and the redundancy can be correspondingly increased by inserting further circuit breakers c,d,, ... and dual isolating switches 31c,32c, ... , 31d, 32d, .... In addition, it is not necessary that the dual isolating switches take over the isolating function in the bridge branches, rather it is also possible to replace each of the dual isolating switches by two isolating switches, the one contact of which is connected to one of the nodes.

For a switching system having n nodes, in a ring with simple redundancy, a total of $n+1$ circuit breakers and current transformers, 3 n isolating switches and n dual isolating switches and with a ring with double redundancy, $n+2$ circuit breakers and current transformers, 3 n isolating switches and 2 n dual isolating switches are required. The physical arrangement of these devices can correspond to the circuit diagram of FIG. 1.

| List of Designations | |
| --- | --- |
| 1, 2, 3, 4, 5, 6 | Nodes |
| 11, 12, 13, 14, 15, 16 | Current branches |
| 21, 22, 23, 24, 25, 26 | Current outputs and inputs |
| 31a, 31b, 32a, 32b, 33a, 34a, 35a, 36a | Dual isolating swithches |
| 41a, 41b, 42a, 42b, 43a, 44a, 45a, 46a | Centre contacts |
| 51a, 51b, 52a, 52b, 53a, 54a, 55a, 56a, 61a, 61b, 62a, 62b, 63a, 64a, 65a, 66a | Outer contacts |
| 71a, 71b, 72a, 72b | Connecting Lines |
| 73 | Current transformer |
| 74 | Housing |
| 81, 82, 83, 84, 85, 86 | Pipe-type gas-filled cable |
| 91a, 92a, 93a, 94a, 95a, 96a | Contact parts |
| 100 | Frame |
| 101 | Drive |
| a, b | Circuit breakers |

We claim:

1. A switching system, comprising:

a plurality of nodes;

interruptable current branches which, when closed, connect said nodes in the form of a ring; and at least two bridge branches for connecting each of said nodes to at least two other nodes, each of said bridge branches including a first group of isolating switches each having a first contact and a second contact, said first contact being connected to one of said nodes, a second group of isolating switches each having a first contact and a second contact, said first contact being connected to another one of said nodes, and a circuit breaker having two terminals respectively connected to said second contacts of said first group of switches and said second contacts of said second group of switches.

2. The switching system of claim 1, wherein at least one of the isolating switches of each of said first and second groups of switches comprised of single-pole, double throw isolating switches each having a common contact connected to one of said nodes and two other terminals respectively connected to the two terminals of said circuit breaker.

3. The switching system of claim 2, wherein all of the isolating switches of said first and second groups of switches are comprised of single-pole, double-throw isolating switches having common contacts respectively connected to said nodes and two other terminals respectively connected to two bus bars which are respectively connected to the two terminals of said circuit breaker.

4. The switching system of claim 3 wherein at least one of said single-pole, double-throw isolating switches includes a rotatable blade connected to said common contact.

5. The switching system of claim 2 wherein said one node is also connected to the first contact of an isolating switch in a group of switches in the other of said two bridge branches.

* * * * *